United States Patent [19]
Takano

[11] Patent Number: 5,222,648
[45] Date of Patent: Jun. 29, 1993

[54] BONDER

[75] Inventor: Tadashi Takano, Tokyo, Japan

[73] Assignee: Kaijo Corporation, Tokyo, Japan

[21] Appl. No.: 934,265

[22] Filed: Aug. 25, 1992

[30] Foreign Application Priority Data

Sep. 4, 1991 [JP] Japan .................. 3-250217

[51] Int. Cl.⁵ .............................................. B23K 3/00
[52] U.S. Cl. ..................................... 228/5.5; 228/8; 228/9; 228/102; 228/106
[58] Field of Search ............. 228/5.5, 6.2, 8, 9, 228/44.7, 102, 106, 180.2

[56] References Cited

U.S. PATENT DOCUMENTS

| | | | |
|---|---|---|---|
| 3,608,809 | 9/1971 | Cushman | 228/5.5 |
| 3,804,319 | 4/1974 | Piechocki | 228/5.5 |
| 4,638,937 | 1/1987 | Belanger, Jr. | 228/106 |
| 4,848,639 | 7/1989 | Belanger, Jr. | 228/106 |
| 4,896,811 | 1/1990 | Dunn et al. | 228/5.5 |
| 5,092,510 | 3/1992 | Anstrom et al. | 228/5.5 |
| 5,127,573 | 7/1992 | Chang et al. | 228/5.5 |

Primary Examiner—Samuel M. Heinrich
Attorney, Agent, or Firm—Sughrue, Mion, Zinn, Macpeak & Seas

[57] ABSTRACT

A bonder that allows replacement of the bonding tool, corresponding to changes in the type of bonded component, to be performed both easily and rapidly, while also preventing the occurrence of operator-initiated errors accompanying the changes in bonded component type. As a result of allowing a bonding plate, which jointly applies compressive force to bonded components with a bonding tool, to float freely while being held by a diaphragm, the bonded components are adhered to the pressing surface of the bonding tool by the unrestricted bending of the diaphragm so as to follow its motion, thus eliminating the need for an operator to adjust the inclination of the bonding tool, as is necessary in conventional bonders.

13 Claims, 3 Drawing Sheets

BONDER

BACKGROUND OF THE INVENTION

1. Field of the Invention

The present invention relates to a bonder that can be used in the case of inner lead bonding of semiconductor components such as semiconductor integrated circuits (IC) and large-scale integrated circuits (LSI) as the bonded components, or in the case of outer lead bonding of inner lead bonded semiconductor devices as the bonded components.

2. Description of the Prior Art

With respect to the prior art, a tape bonding device like that indicated in FIG. 1 is used for this type of bonding. The device indicated in FIG. 1 has a support mechanism 3 containing a flat bonding plate 2 on which a semiconductor integrated circuit (to be abbreviated as "IC") 1 is placed as the bonded component. Said support mechanism 3 is loaded on XYθ table 4. After IC 1 is positioned relative to a lead (not shown) provided on tape carrier 6 that is brought above said IC by a transport mechanism not shown, said IC 1 is bonded by thermocompression by said bonding device resulting in bonding of said lead and the bump (electrode) of IC 1. XYθ table 4 aligns the relative positions of said lead arranged on tape carrier 6 and the bump of IC 1 by making positional corrections of the two-dimensional coordinates in the horizontal plane as well as the angle of rotation with respect to support mechanism 3.

On the other hand, bonding tool 8 for pressing IC 1 onto bonding plate 2 is mounted above bonding plate 2. This bonding tool 8 is attached to a tool vertical movement mechanism 9 functioning as an approach and withdrawal mechanism, allowing bonding tool 8 to approach and withdraw from bonding plate 2. This tool vertical movement mechanism 9 is equipped with tool holder 11, which allows bonding tool 8 to be attached and removed as desired, holder mounting block 12, which acts as a stand for holding said tool holder 11, sliding guide 13, intermediate slider 14 and sliding guide 15.

Pressurization mechanism 17 is arranged further above bonding tool 8 as a device for providing pressure for the the pressing performed by said bonding tool 8. Said pressurization mechanism 17 is attached to XY table 19 together with the above-mentioned tool vertical movement mechanism 9.

The following provides an explanation of the operation of the device of the prior art comprised in the manner described above.

Firstly, when tape carrier 6 is intermittently fed at a prescribed pitch to a position above IC 1 placed on bonding plate 2, XYθ table 4 is activated according to the command from a control device not shown, which aligns the positions of the lead on tape carrier 6 and IC 1. Then, XY table 19 operates to position bonding tool 8 with respect to said lead and the bump of IC 1. When this positioning is completed, the tool vertical movement mechanism 9 operates to lower bonding tool 8 and bring it in contact with IC 1. Simultaneously, output shaft 17a of pressurization mechanism 17 protrudes to apply pressing force to bonding tool 8 resulting in bonding connection between the bump of IC 1 and the lead by thermocompression bonding. Furthermore, heating of the bonding connection area is performed by a cartridge heater, etc., (not shown) contained within bonding tool 8. In addition, the lowering and raising of bonding tool 8 is detected by a displacement sensor 20 provided on tool vertical movement mechanism 9.

When this bonding connection is completed, the tape bonding device of the prior art returns to the state indicated in FIG. 1 through a process that is the reverse of that described above. A series of the above-mentioned operations are then continued to perform bonding connection for a large number of ICs.

However, in the case of performing bonding connection using the operations described above, the parallelism between IC 1 and the pressing surface of bonding tool 8 becomes important. In order to obtain this, an inclination adjustment mechanism (not shown) is provided within tool holder 11 to mutually adjust the inclinations of said IC and bonding tool.

However, in the device of the prior art, it is necessary to perform adjustment by operating the above-mentioned inclination adjustment mechanism each time bonding tool 8 is replaced accompanying changes in the type of IC 1, the bonded component. As this type of adjustment procedure requires a considerable amount of time and labor, in addition to being bothersome for the operator, it is a problem that should be solved in terms of attempting to improve the speed and efficiency of bonding work. In addition, there is also the additional shortcoming that if an error should happen to be made in this adjustment work, there is the risk of that error leading to damage of IC 1 as well as malfunction of the device itself due to the resulting erroneous operation of the device.

SUMMARY OF THE INVENTION

Accordingly, in consideration of the shortcomings of the the above-mentioned prior art, the object of the present invention is to provide a bonder that allows replacement of the bonding tool to be performed both rapidly and easily corresponding to changes in the type of bonded component, and is also able to prevent the occurrence of human-initiated errors accompanying such changes.

The bonder pertaining to the present invention comprises: a support mechanism containing a bonding plate on which bonded components are placed; a bonding tool for pressing the above-mentioned bonded components onto the above-mentioned bonding plate; an approach and withdrawal positioning device which brings the above-mentioned bonding tool in contact with the above-mentioned bonding plate and then moves it away, while also positioning said bonding tool in the vertical plane with respect to the direction of approach and withdrawal; and, a pressure application device that applies pressing force to the above-mentioned bonding tool; wherein, the above-mentioned support mechanism is equipped with a elastic member that holds the above-mentioned bonding plate.

DESCRIPTION OF THE PREFERRED EMBODIMENTS

The following provides a description of the preferred embodiments of the bonder of the present invention with reference to the drawings.

Figure 1:
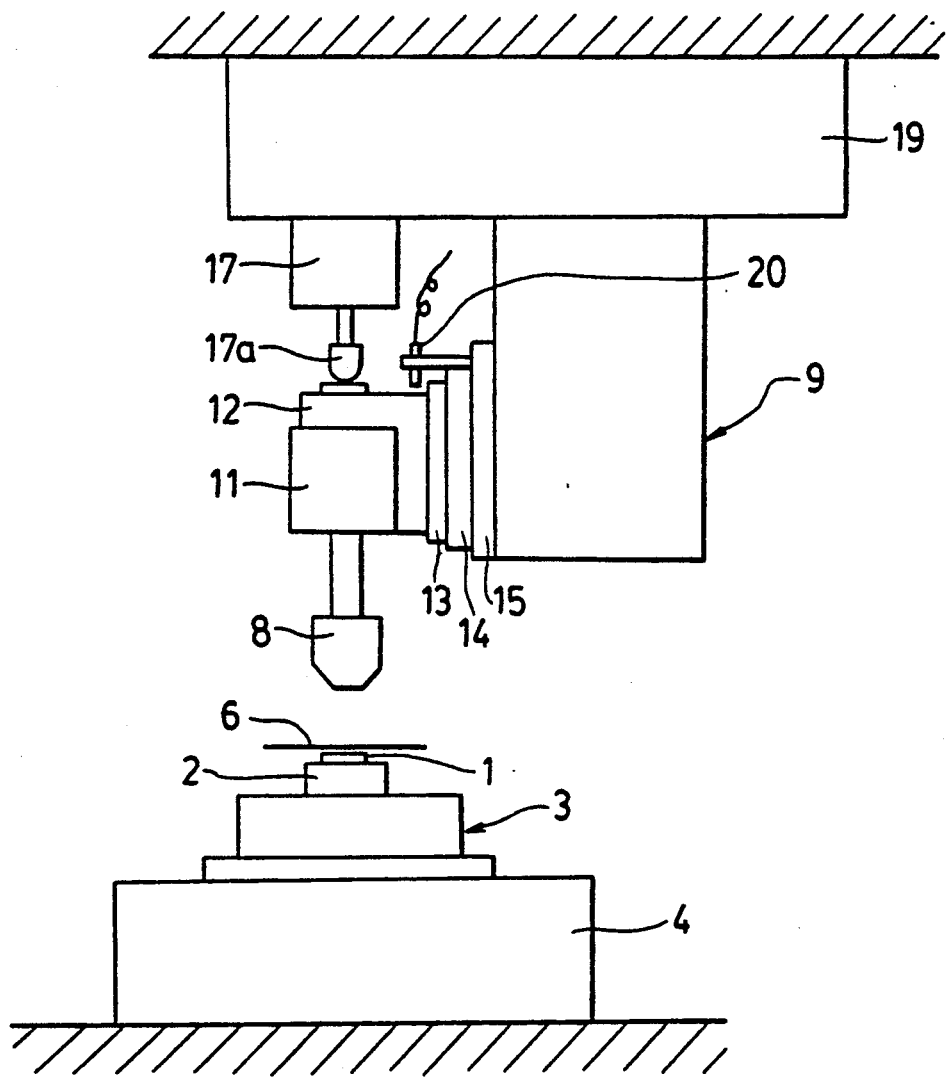
FIG. 1 is a side view of the bonding device of the prior art.
Figure 2:
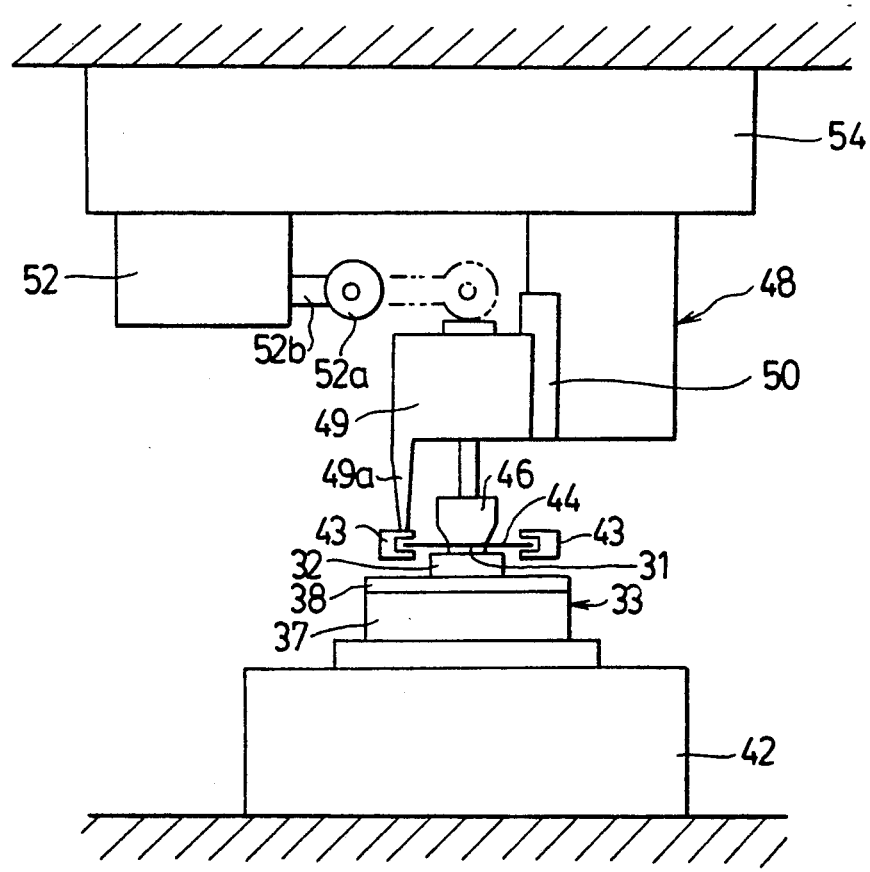
FIG. 2 is a side view of the bonder pertaining to the present invention.
Figure 3:
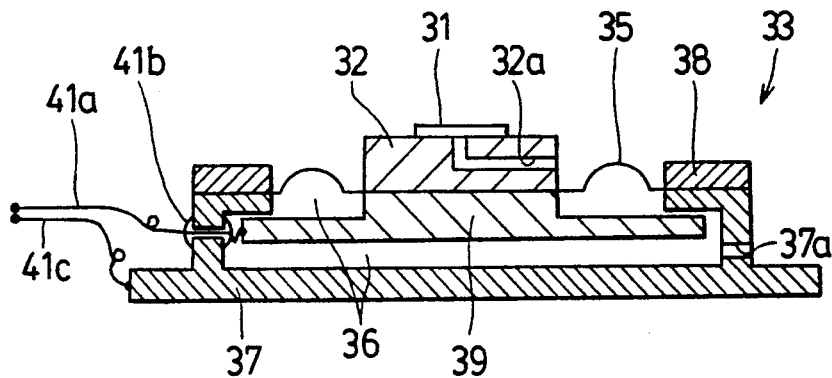
FIG. 3 is a vertical cross-sectional view of the support mechanism equipped on the bonder indicated in FIG. 2.

As indicated in FIG. 2, the bonder pertaining to the present invention has support mechanism 33 equipped with a flat bonding plate 32 on which is placed IC 31, the bonded component. As indicated in FIG. 3, vacuum supply port 32a is formed on bonding plate 32 for adhering the IC 31 to the bonding plate 32. Support mechanism 33 has a disphragm 35, functioning as an elastic member formed essentially into the shape of a circle that holds bonding plate 32 in the center of its upper surface, and a housing base 37 that defines a sealed space 36 between the diaphragm 35 and the base 37. Diaphragm 35 is fixed with respect to housing base 37 by diaphragm locking plate 38 around its periphery. Additionally, floater 39 is mounted on the lower surface in the center of diaphragm 35. Furthermore, as is indicated in FIG. 3, air supply port 37a is formed in the vicinity of the bottom of housing base 37 to supply compressed air into sealed space 36 in the form of a pressurized fluid fed by a pressurization device not shown. In addition, a through hole is formed near the upper edge of housing base 37, and a single lead wire 41a is connected to floater 39 inserted through sealed space 36 via said through hole. However, this through hole is sealed with packing material 41b. On the other hand, another lead wire 41c is connected to housing base 37. Both floater 39 and housing base 37 are electrically conductive, and are thereby able to compose electrical contacts.

As indicated in FIG. 2, support mechanism 33 is provided on XYθ table 42. IC 31 is bonded by thermal compression to a lead (not shown) provided on tape carrier 44 that is transported above said IC 31 by a transport mechanism equipped with tape clamp 43 (not shown except for said tape clamp) by said bonder. This results in bonding connection of said lead and the bump of IC 31. The above-mentioned XYθ table 42 performs positional correction of two-dimensional coordinates in the horizontal plane as well as the angle of rotation with respect to support mechanism 33, and thereby aligns the relative positions of the lead on tape carrier 44 and the bump of IC 31. Furthermore, the construction of tape clamp 43 is such that it is able to suitably move in the vertical direction in the drawing by a mechanism not shown.

As indicated in FIG. 2, bonding tool 46 is arranged above XYθ table 42 and support mechanism 33. The function of bonding tool 46 is to perform bonding by pressing bonding plate 32 on which is placed IC 31. Bonding tool 46 contains a built-in cartridge heater (not shown) for heating. This bonding tool 46 is moved up and down so as to approach and withdraw from bonding plate 32 by tool vertical movement mechanism 48 functioning as an approach and withdrawal mechanism. Tool vertical movement mechanism 48 is composed of tool holder 49, which acts as a slider to hold bonding tool 46, sliding guide 50, which guides said tool holder 49 during vertical movement, and a drive device (not shown) which moves this tool holder 49 up and down. Furthermore, pusher 49a is provided on tool holder 49 to push down tape clamp 43.

Tool stopper 52 is mounted to the side of tool vertical movement mechanism 48 functioning as a regulating device that regulates the rising of bonding tool 46, or in other words, the movement during the time it withdraws from bonding plate 32. Output shaft 52b projects from this tool stopper 52, on the end of which is provided roller 52a. Together with a pressurization device supplying compressed air into sealed space 36 (shown in FIG. 3) described above, this tool stopper 52 comprises a device for applying pressure to apply pressing force to bonding tool 46.

The above-mentioned tool vertical movement mechanism 48 and tool stopper 52 are attached to XY table 54. XY table 54 operates in the horizontal plane perpendicular to the vertical direction in which the bonding tool 46 approaches and withdraws from bonding plate 32. In addition to allowing bonding tool 46 to approach and withdraw from bonding plate 32, this XY table 54 and tool vertical movement mechanism 48, functioning as an approach and withdrawal mechanism that positions bonding tool 46 in a plane perpendicular to the direction in which it approaches and withdraws from bonding plate 32. Furthermore, a photographic device (not shown), comprising a camera, illumination lamps and so forth, is installed on XY table 54 in this embodiment.

The following provides an explanation of the operation of the bonder comprised in the manner described above.

Firstly, in the state in which bonding tool 46 is first moved upward in the drawings, tool vertical movement mechanism 48 recedes from the state indicated in FIG. 2 to, for example, the right in the same drawing by the operation of XY table 54. In addition, tape clamp 43 also recedes upward from the state indicated in FIG. 2 by the action of a mechanism not shown. Additionally, XYθ table 42 is also moved and positioned so as to secure a comparatively large space above bonding plate 32, after which IC 31 is grabbed or absorbed, transported by a transport device not shown, and placed on said bonding plate 32. Then, XYθ table 42 again moves so as to be positioned under tape clamp 43.

Tape clamp 43 then moves to the position indicated in FIG. 2, or in other words, to the position at which tape carrier 44 is in close proximity to IC 31. As bonding tool 46 is in the upper receded position at this time, after photographing the bump of IC 31 and the lead with a photographic device by moving XYθ table 42 or XY table 54, and making relative positional corrections by moving XYθ table 42 and XY table 54 based on the data from the photographic device, alignment of the lead on tape carrier 44 (not shown) and the bump of IC 31 is performed.

When alignment of the positions of the lead on tape carrier 44 and IC 31 is completed, XY table 54 operates to perform relative positioning in the horizontal plane of bonding tool 46 with respect to said lead and IC 31. Bonding tool 46 is lowered together with tool holder 49 by the operation of tool vertical movement mechanism 48. The end of said bonding tool 46 makes contact with the lead on tape carrier 44 after which this is pressed down slightly. Consequently, as indicated in FIG. 3, floater 39, which is maintained in contact with the upper flange portion of housing base 37 by the pressure of the compressed air supplied into sealed space 36, is pushed down resulting in the release of this contact state which interrupts the electrical contacts of the two lead wires 41a and 41c that had been in the connected state. As a result, the operation of tool vertical movement mechanism 48 stops. Furthermore, at this time, as the pressure within sealed space 36 is held to the minimum required level, the amount of pressure received by bonding plate 32 via tape carrier 44 during lowering of bonding tool 46 is small, thereby avoiding the effects of said pressure on tool vertical movement mechanism 48.

Simultaneous to the stopping of tool vertical movement mechanism 48, tool stopper 52 protrudes resulting in roller 52a, indicated with the broken line in FIG. 2, regulating the rising operation of bonding tool 46, or in other words, the operation by which bonding tool 46 withdraws from bonding plate 32. In this state, compressed air is supplied into sealed space 36 through air supply port 37a indicated in FIG. 3, which applies uniform pressing force to the lead on tape carrier 44 and IC 31, thereby performing bonding connection of both by thermocompression bonding.

However, at the time bonding tool 46 is lowered by the operation of tool vertical movement mechanism 48 in the manner described above, as pusher 49a provided on tool holder 49 makes contact with tape clamp 43 and pushes it down as indicated in FIG. 2, a highly precise adhered state is maintained between the above-mentioned lead and IC 31.

Figure 4:
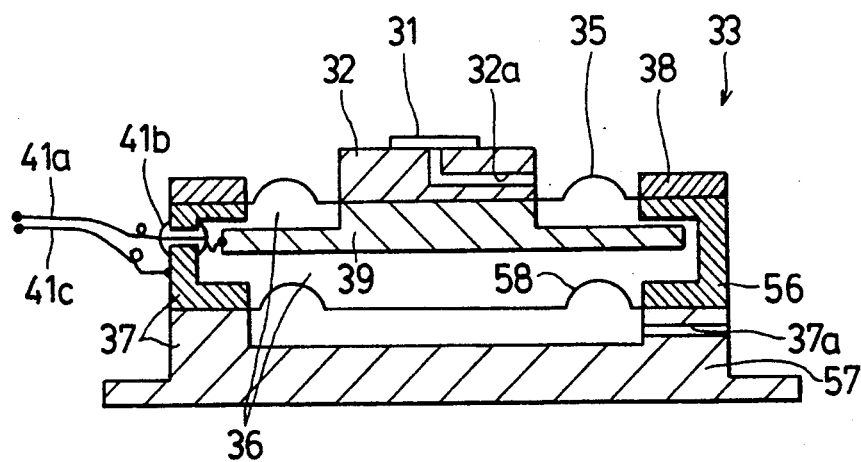
FIG. 4 is a vertical cross-sectional view of a variation of the support mechanism indicated in FIG. 3.

FIG. 4 indicates a variation of support mechanism 3 in the above-mentioned bonder. Furthermore, in support mechanism 33 indicated in FIG. 4, the same reference numerals are used for those portions that are similar or correspond to support mechanism 33 indicated in FIG. 3.

In support mechanism 33 indicated in FIG. 4, housing base 37, supporting the diaphragm 35 and defining the sealed space 36, is divided into two upper and lower blocks 56 and 57. In addition, an additional diaphragm 58 is positioned in between these two blocks, and an inert gas is charged into sealed space 36. This type of construction is able to prevent oxidation of the portion where lead wire 41a is connected to floater 39.

As has been described above, in the bonder pertaining to the present invention, since the bonding plate, on which components to be bonded are placed, is allowed to float freely while being supported by an elastic member, bonded components are adhered to the pressing surface of the bonding tool by the unrestricted bending of this elastic member so as to follow its motion. Thus, the adjustment of the inclination of the bonding tool that had been performed by the operator in the past is no longer required, which in addition to achieving simplification and considerable shortening of the amount of time required to replace the bonding tool accompanying changes in the type of bonded components, also allows problems based on adjustment errors on the part of the operator to be avoided, thereby offering the advantage of the present invention of improved productivity.

What is claimed is:

1. A bonder, comprising:
   a support mechanism including a bonding plate on which components to be bonded are placed;
   a bonding tool for pressing against said components on said bonding plate;
   an approach and withdrawal positioning device which brings said bonding tool into pressure contact with said bonding plate and then moves it away, while also positioning said bonding tool in the vertical plane with respect to the direction of approach and withdrawal; and
   a pressure application device that applies a pressing force to said bonding tool, wherein said support mechanism comprises:
   a housing base;
   an elastic member that holds the bonding plate and which is supported by said housing base, said elastic member comprising a diaphragm, and wherein said diaphragm and said housing base together define a sealed space;
   a pressurization device that supplies and interrupts the supply of a pressurized fluid into said sealed space; and
   a floating member suspended from said diaphragm to extend horizontally within said sealed space for receiving the force of said pressurized fluid.

2. A bonder, as recited in claim 1, further comprising a regulation device for regulating the withdrawal of said bonding tool from said bonding plate.

3. A bonder, as recited in claim 2, wherein said regulation device comprises a tool stopper, an output shaft operatively connected to said tool stopper and extending approximately horizontally therefrom, and a roller rotatively connected to an end of said output shaft opposite said tool stopper and engaging an upper surface of said tool holder for regulating the withdrawal of said tool holder and, therefore, said bonding tool.

4. A bonder, as recited in claim 1, further comprising a second diaphragm supported by said housing base and extending horizontally within said sealed space and beneath said floating member so as to divide said sealed space into an upper sealed space, containing said floating member, and a lower sealed space.

5. A bonder, as recited in claim 4, wherein said upper sealed space is filled with an inert gas.

6. A bonder, as recited in claim 1, wherein said floating member and said housing base are electrically conductive thereby forming electrical contacts, and said floating member and said housing base are connected to an electrical circuit, and wherein the operation of said approach and withdrawal positioning device is stopped when it is determined from the electrical circuit that said floating member and said housing base are not in contact.

7. A bonder, as recited in claim 4, wherein said floating member and said housing base are electrically conductive thereby forming electrical contacts, and said floating member and said housing base are connected to an electrical circuit, and wherein the operation of said approach and withdrawal positioning device is stopped when it is determined from the electrical circuit that said floating member and said housing base are not in contact.

8. A bonder, as recited in claim 1, wherein said bonding plate includes a vacuum supply port for adhering the bonded components to said bonding plate.

9. A bonder, as recited in claim 4, wherein said bonding plate includes a vacuum supply port for adhering the bonded components to said bonding plate.

10. A bonder, as recited in claim 1, wherein said approach and withdrawal positioning device includes a tool holder and a sliding guide, said sliding guide guiding the vertical movement of said tool holder and, therefore, said bonding tool.

11. A bonder, as recited in claim 4, wherein said approach and withdrawal positioning device includes a tool holder and a sliding guide, said sliding guide guiding the vertical movement of said tool holder and, therefore, said bonding tool.

12. A bonder, as recited in claim 4, wherein said approach and withdrawal positioning device has an XY table that operates in a plane perpendicular to the direction of said approach and withdrawal, and an approach and withdrawal mechanism that is provided on said XY table, holds said bonding tool, and moves said bonding tool in the direction of said approach and withdrawal.

13. A bonder as claimed in claim 1 wherein said approach and withdrawal positioning device has an XY table that operates in a plane perpendicular to the direction of said approach and withdrawal, and an approach and withdrawal mechanism that is provided on said XY table, holds said bonding tool, and moves said bonding tool in the direction of said approach and withdrawal.

\* \* \* \* \*